(12) United States Patent
Yang et al.

(10) Patent No.: US 11,209,690 B2
(45) Date of Patent: Dec. 28, 2021

(54) DISPLAY PANEL AND DISPLAY DEVICE

(71) Applicant: BOE Technology Group Co., Ltd., Beijing (CN)

(72) Inventors: Shengji Yang, Beijing (CN); Xue Dong, Beijing (CN); Xiaochuan Chen, Beijing (CN); Hui Wang, Beijing (CN); Kuanta Huang, Beijing (CN); Pengcheng Lu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 16/660,925

(22) Filed: Oct. 23, 2019

(65) Prior Publication Data

US 2020/0218114 A1    Jul. 9, 2020

(30) Foreign Application Priority Data

Jan. 3, 2019    (CN) .......................... 201910004298.6

(51) Int. Cl.
*G02F 1/1335*    (2006.01)
*G02F 1/13357*   (2006.01)
*G02F 1/1362*    (2006.01)

(52) U.S. Cl.
CPC .. *G02F 1/133512* (2013.01); *G02F 1/133526* (2013.01); *G02F 1/133606* (2013.01); *G02F 1/136277* (2013.01); *G02F 1/133607* (2021.01)

(58) Field of Classification Search
None
See application file for complete search history.

(56) References Cited

U.S. PATENT DOCUMENTS

| | | | | |
|---|---|---|---|---|
| 5,349,453 | A | * 9/1994 | Munakata | G02F 1/133526 349/95 |
| 5,808,712 | A | * 9/1998 | Hishida | G02F 1/133526 349/138 |
| 2009/0174837 | A1 | 7/2009 | Chang et al. | |
| 2011/0205468 | A1 | * 8/2011 | Hirakata | G02F 1/133555 349/95 |

(Continued)

FOREIGN PATENT DOCUMENTS

CN    103529592 A    1/2014
CN    104656180 A    5/2015

(Continued)

OTHER PUBLICATIONS

Office Action for corresponding Chinese Application 201910004298.6 dated Mar. 1, 2021.

*Primary Examiner* — James A Dudek
(74) *Attorney, Agent, or Firm* — Arent Fox LLP; Michael Fainberg

(57) ABSTRACT

A display panel and a display device are disclosed. The display panel includes: color photoresist patterns, black matrix patterns for spacing the color photoresist patterns from each other; and a plurality of light-modulating components on sides of the color photoresist patterns and the black matrix patterns away from a light-emitting surface of the display panel, wherein each of the color photoresist patterns corresponds to at least one of the light-modulating components, and the light-modulating components are configured to converge light incident thereon, and to transmit the converged light to the color photoresist patterns corresponding thereto.

12 Claims, 7 Drawing Sheets

(56) References Cited

U.S. PATENT DOCUMENTS

| | | | |
|---|---|---|---|
| 2014/0125928 A1* | 5/2014 | Chen | G02F 1/133526 |
| | | | 349/106 |
| 2018/0027225 A1* | 1/2018 | Masumura | H04N 13/128 |
| | | | 348/59 |
| 2018/0359461 A1* | 12/2018 | Koerber | H04N 13/349 |
| 2020/0174279 A1* | 6/2020 | Ishihara | H04N 13/324 |

FOREIGN PATENT DOCUMENTS

| | | |
|---|---|---|
| CN | 106773272 A | 5/2017 |
| EP | 0718665 A2 | 6/1996 |
| JP | 9304762 A | 11/1997 |

* cited by examiner

DISPLAY PANEL AND DISPLAY DEVICE

CROSS-REFERENCE TO RELATED APPLICATION

This disclosure claims priority to Chinese Patent Application No. 201910004298.6, filed on Jan. 3, 2019, the content of which is incorporated by reference in the entirety.

FIELD

The disclosure relates to the field of display technologies, and particularly to a display panel and a display device.

DESCRIPTION OF THE RELATED ART

As the display technologies are advancing rapidly, various types of display devices are emerging in the market, and particularly a Liquid Crystal Display (LCD) and an Organic Light-Emitting Diode (OLED) display device have been widely applied.

In the related art, the researches on the display devices are focused on improving their brightness, and particularly the very core index required of display products operating with the emerging Augmented Reality (AR) display technologies is their brightness because the brightness of a screen in an AR product shall be adjusted in different operating environments and scenarios to thereby provide a comfortable visual experience of human eyes, and particularly high brightness of a display device shall be required in an outdoor mode in which it operates under the sun.

SUMMARY

In an aspect, some embodiments of the disclosure provide a display panel including: color photoresist patterns, black matrix patterns for spacing the color photoresist patterns from each other, and a plurality of light-modulating components on sides of the color photoresist patterns and the black matrix patterns away from a light-emitting surface of the display panel, wherein each of the color photoresist patterns corresponds to at least one of the plurality of light-modulating components, and the plurality of light-modulating components are configured to converge light incident thereon and to transmit the converged light to color photoresist patterns corresponding thereto.

In some embodiments, a display area of the display panel is covered with the plurality of light-modulating components.

In some embodiments, the plurality of light-modulating components are formed integrally.

In some embodiments, a boundary of an orthographic projection of a light-modulating component onto a corresponding color photoresist pattern surrounds a boundary of the color photoresist pattern, or is surrounded by the boundary of the color photoresist pattern, or overlaps with the boundary of the color photoresist pattern.

In some embodiments, the plurality of light-modulating components include converging lenses.

In some embodiments, shapes of the converging lenses are arched semi-cylinders, and arc surfaces of the arched semi-cylinders are proximate to the color photoresist patterns than chord surfaces thereof.

In some embodiments, the plurality of light-modulating components further include flat substrates, and the chord surfaces of the converging lenses come into contact with the flat substrates.

In some embodiments, boundaries of orthographic projections of the converging lenses onto the flat substrates overlap with boundaries of the flat substrates.

In some embodiments, the flat substrates are formed integrally with the converging lenses.

In some embodiments, the display panel further includes an over coat layer on sides of the converging lenses proximate to the color photoresist patterns and the black matrix patterns.

In some embodiments, the display panel is an electroluminescent display panel; wherein the electroluminescent display panel further includes a back plate, a self-illuminating device on the back plate, and an encapsulation layer for encapsulating the self-illuminating device, wherein the self-illuminating device includes a first electrode layer, a light-emitting function layer, and a second electrode layer stacked in that order; and the plurality of light-modulating components are arranged on a side of the encapsulation layer away from the back plate, or the plurality of light-modulating components are arranged between the encapsulation layer and the self-illuminating device.

In some embodiments, the back plate includes a silicon-based substrate, and driving circuits on the silicon-based substrate.

In some embodiments, the electroluminescent display panel includes an organic electroluminescent display panel, or a quantum dot light-emitting diode display panel.

In some embodiments, the display panel is a liquid crystal display panel including an array substrate, a box alignment substrate, and a liquid crystal layer between the array substrate and the box alignment substrate; and the box alignment substrate includes the color photoresist patterns and the black matrix patterns, and the plurality of light-modulating components are arranged on the box alignment substrate or the array substrate; or the array substrate includes the color photoresist patterns and the black matrix patterns, and the plurality of light-modulating components are arranged on the array substrate.

In another aspect, some embodiments of the disclosure provide a display device, including the display panel according to the embodiments of the disclosure.

In some embodiments, when the plurality of light-modulating components are converging lenses, and the display panel is an electroluminescent display panel, a distance h between a light-emitting function layer of the electroluminescent display panel, and optical centers of the converging lenses is $n*r/|n-n'|$, wherein n is a refractive index of the converging lenses, n' is a refractive index of a medium on sides of the converging lenses proximate to the color photoresist patterns, and r is a curvature of the converging lenses.

In some embodiments, when the plurality of light-modulating components are converging lenses, and the display panel is a liquid crystal display panel, the display device further comprises a backlight, wherein a distance h between the backlight, and optical centers of the converging lenses is $n*r/|n-n'|$, wherein n is a refractive index of the converging lenses, n' is a refractive index of a medium on sides of the converging lenses proximate to the color photoresist patterns, and r is a curvature of the converging lenses.

BRIEF DESCRIPTION OF THE DRAWINGS

In order to make the technical solutions according to the embodiments of the disclosure, or in the related art more apparent, the drawings to which reference is to be made in the description of the embodiments or the related art will be introduced below in brief, and apparently the drawings to be described below illustrate only some embodiments of the disclosure, and those ordinarily skilled in the art can further derive other drawings from these drawings without any inventive effort.

DETAILED DESCRIPTION OF THE EMBODIMENTS

The technical solutions according to the embodiments of the disclosure will be described below clearly and fully with reference to the drawings in the embodiments of the disclosure, and apparently the embodiments to be described are only a part but not all of the embodiments of the disclosure. Based upon the embodiments of the disclosure, all the other embodiments which can readily occur to those ordinarily skilled in the art without any inventive effort shall fall into the claimed scope of the disclosure.

In the related art, when light is emitted from a display panel, the light incident on a color photoresist pattern is transmitted through and emitted from the color photoresist pattern, and the light incident on a black matrix pattern cannot be transmitted through the black matrix pattern, so that the light incident on the black matrix pattern may be wasted.

Figure 1:
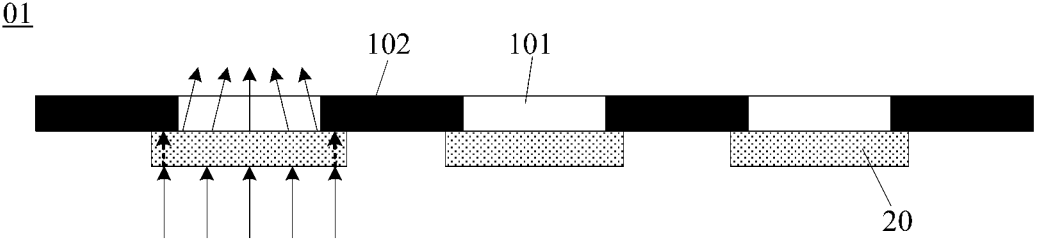
FIG. 1 is a first schematic structural diagram of a display panel according to the embodiments of the disclosure.

In view of this, the embodiments of the disclosure provide a display panel 01 as illustrated in FIG. 1, including: color photoresist patterns (i.e. Color Films (CFs)) 101, and black matrix patterns 102 for spacing the color photoresist patterns 101 from each other.

In some embodiments, the color photoresist patterns 101 include red photoresist patterns, green photoresist patterns, and blue photoresist patterns. In some embodiments, a display area of the display panel 01 includes sub-pixel areas, and pixel definition areas for defining the sub-pixel areas, where the color photoresist patterns 101 are arranged corresponding to the sub-pixel areas, and the black matrix patterns 102 are arranged corresponding to the pixel definition areas.

In the embodiments of the disclosure, the display panel 01 further includes: a plurality of light-modulating components 20 on sides of the color photoresist patterns 101 and the black matrix patterns 102 away from a light-emitting surface of the display panel 01 (i.e., a side of the display panel 01 on which an image is displayed), where each color photoresist pattern 101 corresponds to at least one of the plurality of light-modulating components 20, and the plurality of light-modulating components 20 are configured to converge light incident thereon, and to transmit the converged light to color photoresist patterns 101 corresponding thereto.

It shall be noted that, the light-modulating components 20 are arranged on the sides of the color photoresist patterns 101 and the black matrix patterns 102 away from the light-emitting surface of the display panel, that is, light emitted from the display panel 01 passes firstly the light-modulating components 20 and then the color photoresist patterns 101. Further, another layer may or may not be arranged between the light-modulating components 20, and the color photoresist patterns 101 and the black matrix patterns 102.

In some embodiments, one color photoresist pattern 101 corresponds to one light-modulating component 20. In some other embodiments, one color photoresist pattern 101 corresponds to two or more light-modulating components 20.

In some embodiments, a boundary of an orthographic projection of the light-modulating component(s) onto a corresponding color photoresist pattern 101 surrounds a boundary of the color photoresist pattern 101. In some other embodiments, a boundary of a color photoresist pattern 101 surrounds a boundary of an orthographic projection of the corresponding light-modulating component(s) 20 onto the color photoresist pattern 101. In some other embodiments, a boundary of an orthographic projection of the light-modulating component(s) 20 onto a corresponding color photoresist pattern 101 overlaps with a boundary of the color photoresist pattern 101. Where the size of a light-modulating component 20 will not be limited to any particular size, but can be set according to the size of a corresponding color photoresist pattern 101. For example, if the size of a color photoresist pattern 101 is 3 μm*4.5 μm, then the size of a corresponding light-modulating component 20 can be 3 μm*4.5 μm.

Those skilled in the art shall appreciate that the display panel 01 can include other components, e.g., thin film transistors, an over coat layer, etc., in addition to the color photoresist patterns 101, the black matrix patterns 102, and the light-modulating components 20, although they will not be described here in details.

As illustrated in FIG. 1, if there is no light-modulating component 20, then a part of the light will be incident on a black matrix pattern 102 as denoted by a dotted arrow, and thus cannot exit; and if a light-modulating component 20 is arranged, then this part of the light will be converged by the light-modulating component 20, and thus can exit from a color photoresist pattern 101.

The embodiments of the disclosure provide the display panel 01 including the light-modulating components 20 on the sides of the color photoresist patterns 101 and the black matrix patterns 102 away from the light-emitting surface of the display panel 01, and since the light-modulating components 20 can converge the light incident thereon, and transmit the converged light to the color photoresist patterns 101 corresponding thereto, the converged light can be emitted from the color photoresist patterns 101, thus reducing the amount of light incident on the black matrix patterns 102, and improving the brightness of the display panel.

Figure 2:
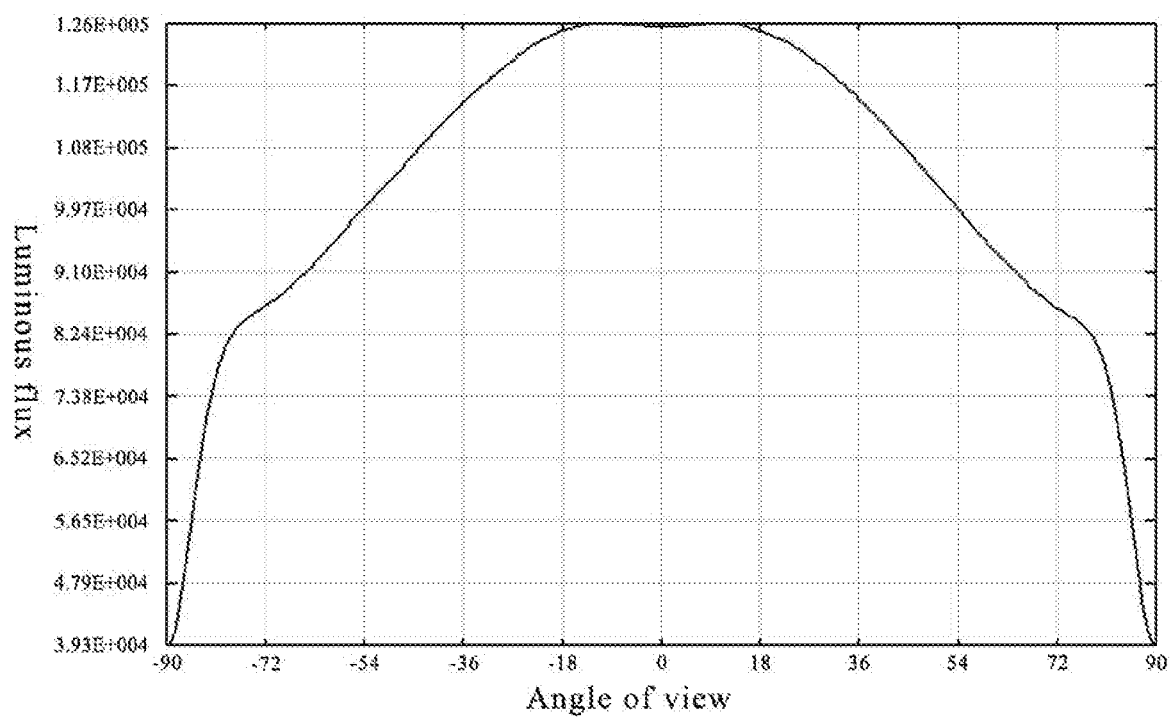
FIG. 2 is a curve of a luminous flux at a varying angle of view on a display panel according to the embodiments of the disclosure, in which no light-modulating component is arranged.
Figure 3:
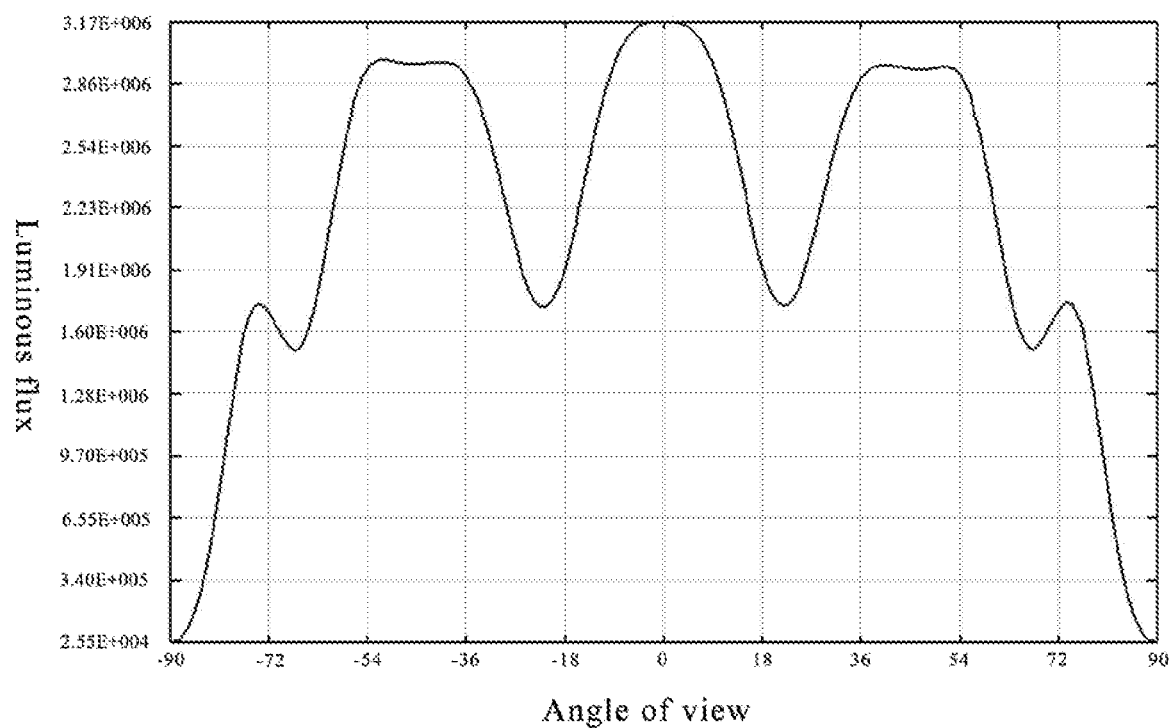
FIG. 3 is a curve of a luminous flux at a varying angle of view on a display panel according to the embodiments of the disclosure, in which a light-modulating component is arranged.

As illustrated in FIG. 2 and FIG. 3, the abscissa represents an angle at which the display panel 01 is watched (i.e., an angle of view), and the ordinates represents a luminous flux. The curve in FIG. 2 represents a luminous flux at a varying angle of view on the display panel 01 including no light-modulating component 02. FIG. 3 represents a luminous flux at a varying angle of view on the display panel 01 including the light-modulating components 02. As can be apparent from comparing FIG. 2 with FIG. 3, the overall luminous flux of the display panel 01 including the light-modulating components 02 is improved to 1.16 times the overall luminous flux of the display panel 01 including no light-modulating component 02, that is, the brightness of the former is improved to 1.16 times the brightness of the latter. At a normal angle of view, the overall luminous flux of the display panel 01 including the light-modulating components 02 is improved to 20 times the overall luminous flux of the display panel 01 including no light-modulating component 02, that is, the brightness of the former is improved to 20 times the brightness of the latter. In summary, the light-modulating components 20 can be arranged to thereby greatly improve the brightness of the display panel 01.

Figure 4:
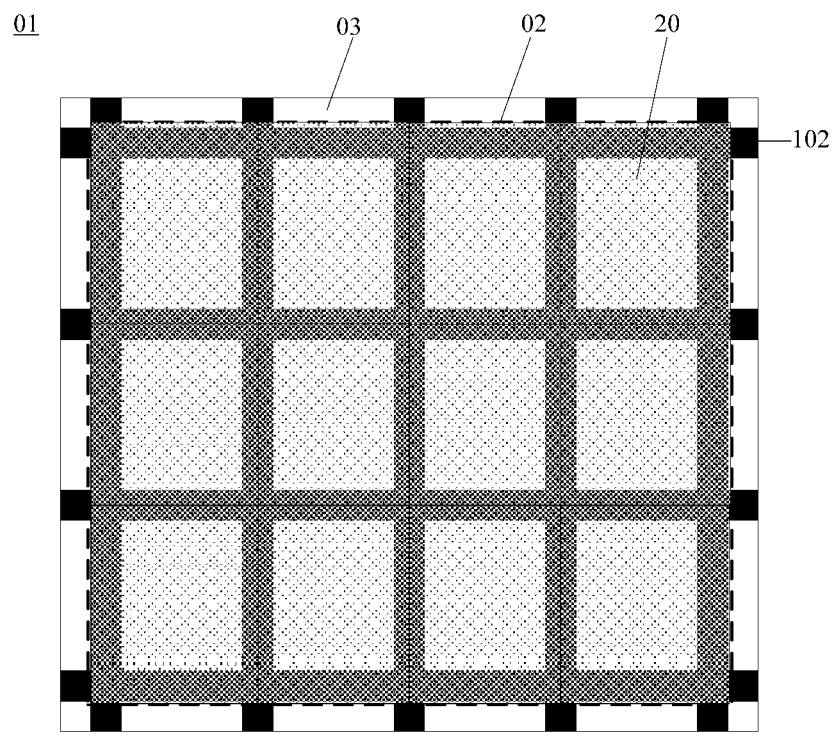
FIG. 4 is a schematic structural diagram of a display area of a display panel, which is covered with a plurality of light-modulating components, according to the embodiments of the disclosure.
Figure 5:
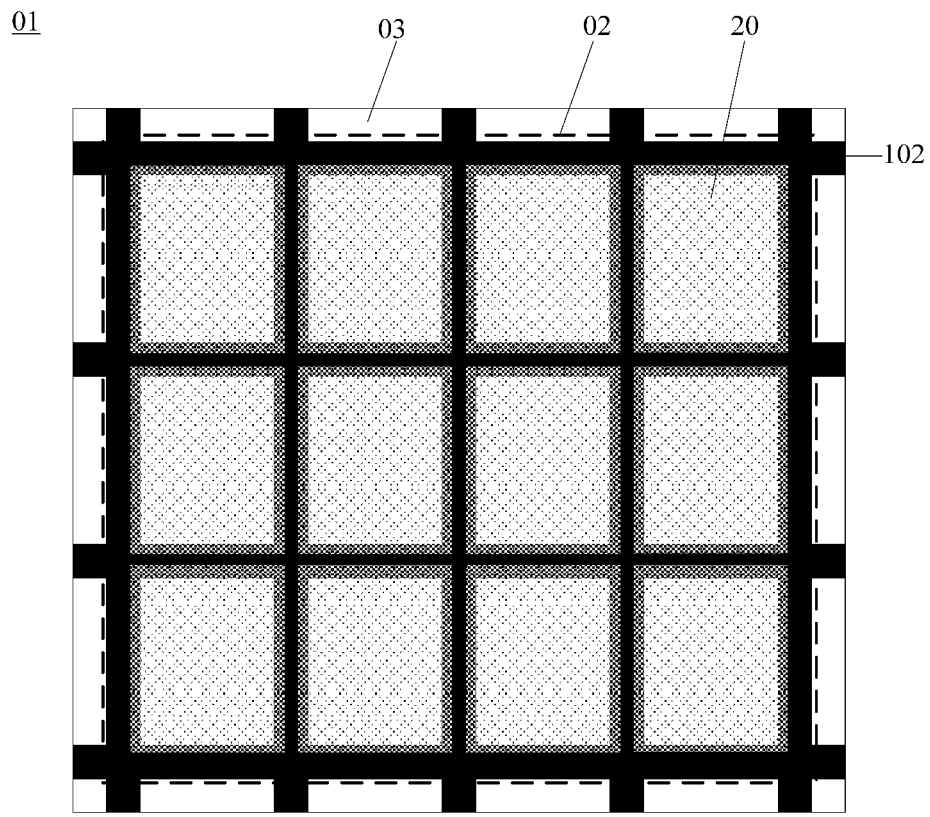
FIG. 5 is a schematic structural diagram of a display area of a display panel, a part of which is covered with a plurality of light-modulating components, according to the embodiments of the disclosure.

As illustrated in FIG. 4 and FIG. 5, the display panel 01 is divided into a display area 02 and a non-display area 03. In some embodiments, as illustrated in FIG. 4, the display area 02 of the display panel 01 is covered with the plurality of light-modulating components 20, and in this case, the plurality of light-modulating components 20 can be formed integrally. In some other embodiments, as illustrated in FIG. 5, a part of the display area 02 of the display panel 01 is covered with the plurality of light-modulating components 20, that is, some part of the display area 02 is not covered with any light-modulating component 20.

In order to enable more light to be incident on and converged by the light-modulating components 20, and then emitted from the color photoresist patterns 101, the display area 02 of the display panel 01 is covered with the plurality of light-modulating components 20 in the embodiments of the disclosure. In this way, all the light incident on the display area 02 can be converged by the light-modulating components 20, and then exit from the color photoresist patterns 101, thus avoiding the light incident on the black matrix patterns 102 from being wasted because the light cannot exit from the black matrix patterns 102, and further improving the brightness of the display panel 01.

In the embodiments of the disclosure, the light-modulating components 20 will not be limited to any particular structure as long as they can converge the light. For example, the light-modulating components 20 include converging lenses. In another example, the light-modulating components 20 include gratings. Since the converging lenses can converge the light, and are simple in structure, and easy to fabricate, the light-modulating components 20 include converging lenses 201 in some embodiments of the disclosure.

In the embodiments of the disclosure, the material of the converging lenses 201 will not be limited to any particular material as long as they can converge the light. For example, the material of the converging lenses 201 can be glass.

Figure 6:
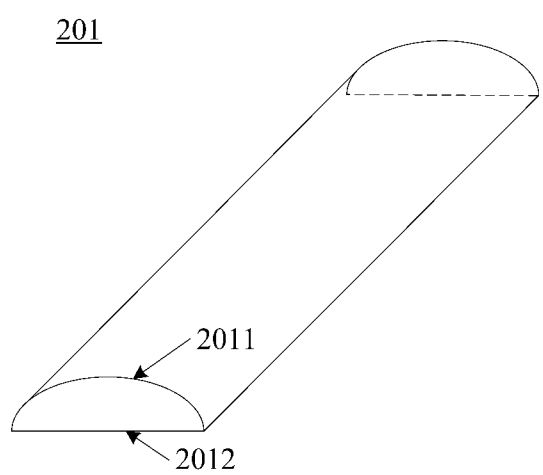
FIG. 6 is a schematic structural diagram of a converging lens according to the embodiments of the disclosure.
Figure 7:
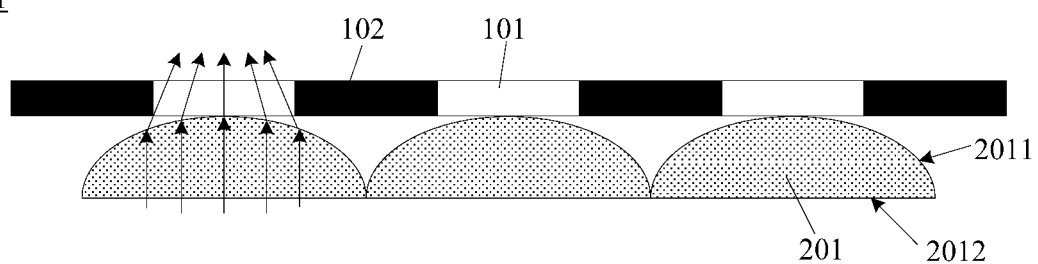
FIG. 7 is a second schematic structural diagram of a display panel according to the embodiments of the disclosure.

Further, the shapes of the converging lenses 201 will not be limited to any particular shape as long as they can converge the light. In some embodiments, since the shapes of the color photoresist patterns 101 (or the shapes of sub-pixel areas) are generally rectangles, the shapes of the converging lenses 201 are arched semi-cylinders as illustrated in FIG. 6. And as illustrated in FIG. 7, an arc surface 2011 of an arched semi-cylinder is proximate to the color photoresist patterns 101 than a chord surface 2012 thereof.

It shall be noted that, the arched semi-cylinder is a shape obtained by cutting a cylinder along a height direction thereof, and as illustrated in FIG. 6, an arched semi-cylinder includes an arc surface 2011, a chord surface 2012, and two side surfaces.

Here a curvature of the arc surface 2011 of the arched semi-cylinder will not be limited to any particular curvature, but can be set according to the sizes of the color photoresist patterns 101 and the converging lenses 201. For example, the curvature of the arc surface 2011 of the arched semi-cylinder can be 7 μm or any other value as needed. Further, object distances of the converging lenses 201 can depend upon the curvatures of the arc surfaces 2011 of the arched semi-cylinders.

In the embodiments of the disclosure, since the shapes of the converging lenses 201 are arched semi-cylinders, the light can be converged by the arc surfaces 2011 of the arched semi-cylinders. Moreover, the shapes of the converging lenses 201 are arched semi-cylinders, so converging lenses 201 are easy to fabricate.

Figure 8:
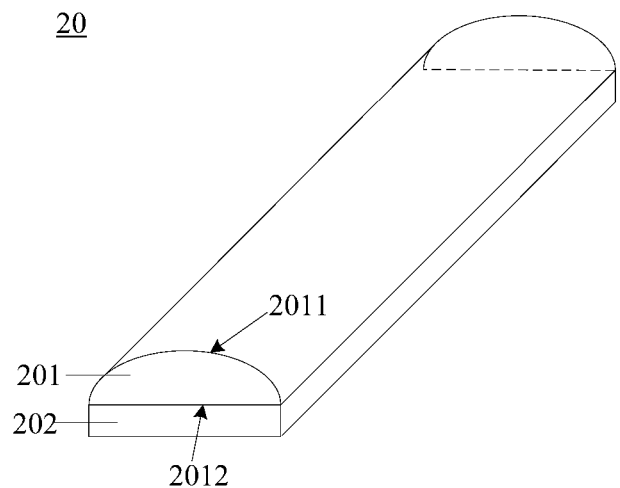
FIG. 8 is a schematic structural diagram of a light-modulating component including a converging lens and a flat substrate according to the embodiments of the disclosure.
Figure 9:
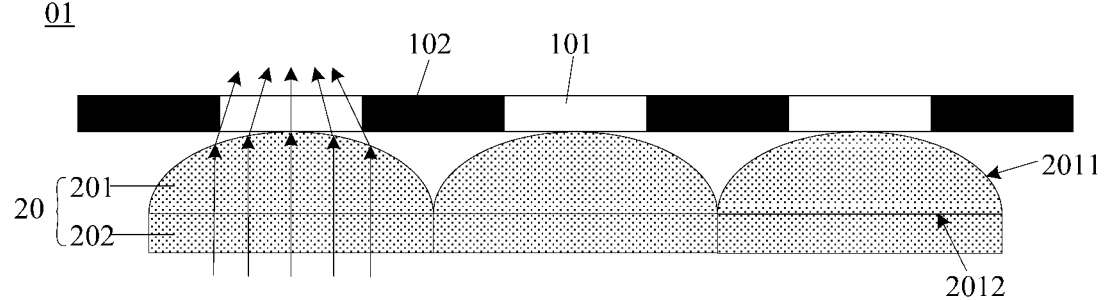
FIG. 9 is a third schematic structural diagram of a display panel according to the embodiments of the disclosure.

Hereupon, since the light is converged at the focuses of the converging lenses 201 and then diverged, the luminous flux exiting from the color photoresist patterns 101 depends upon the distances between the converging lenses 201, and the color photoresist patterns 101 and a light source. Accordingly, as illustrated in FIG. 8 and FIG. 9, the light-modulating components 20 further include flat substrates 202, and the chord surfaces 2012 of the converging lenses 201 come into contact with the flat substrates 202.

In the embodiments of the disclosure, the thicknesses of the flat substrates 202 will not be limited to any particular thickness, but can be set as needed according to desirable distances between the converging lenses 201, and the color photoresist patterns 101 and the light source respectively. For example, if a distance h between the light source, and an optical center of a converging lens 201 is to be set to be 10 μm, that is, the converging lens is to be placed at a height of 10 μm, then the thickness of a corresponding flat substrate 202 may be set to enable the h being 10 μm.

Moreover, the material of the flat substrates 202 will not be limited to any particular material, but may or may not be the same as the converging lenses 201. In order to simplify a process of forming the flat substrates 202 and the converging lenses 201, in the embodiments of the disclosure, the material of the flat substrates 202 are the same as the material of the converging lenses 201, and the flat substrates 202 are formed integrally with the converging lenses 201.

Figure 10:
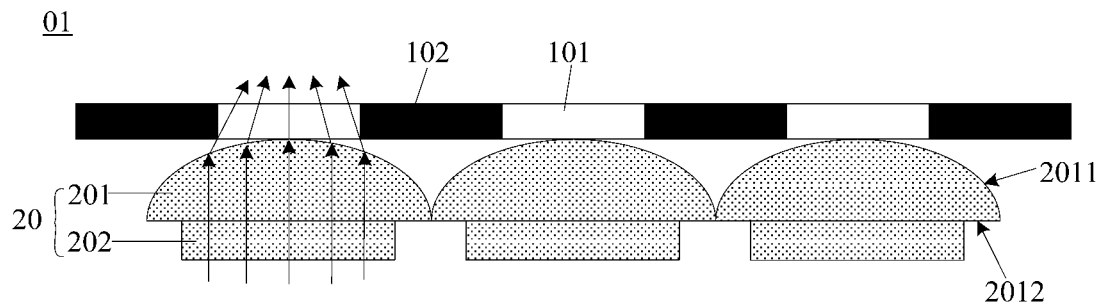
FIG. 10 is a fourth schematic structural diagram of a display panel according to the embodiments of the disclosure.
Figure 11:
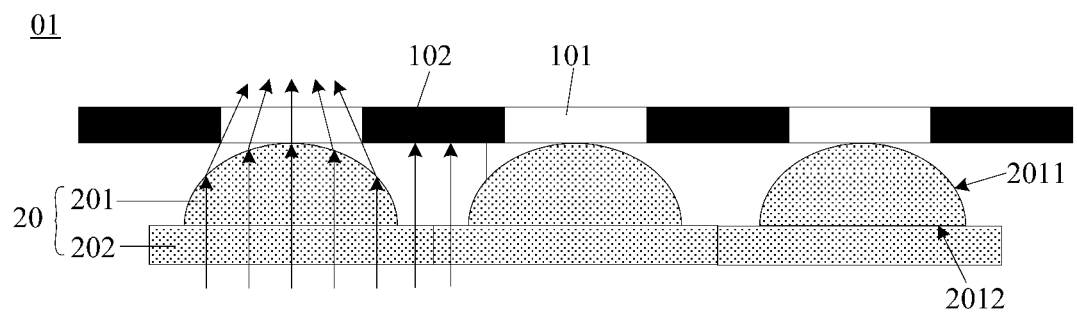
FIG. 11 is a fifth schematic structural diagram of a display panel according to the embodiments of the disclosure.

In the embodiments of the disclosure, the sizes of the flat substrates 202 will not be limited to any particular size. As illustrated in FIG. 10, if a boundary of an orthographic projection of a converging lens 201 onto a corresponding flat substrate 202 surrounds a boundary of the corresponding flat substrate 202, that is, the size of the converging lens 201 is larger than the size of the corresponding flat substrate 202, and the flat substrates 202 are formed integrally with the converging lenses 201, then the flat substrates 202 and the converging lenses 201 will be difficult to fabricate. And as illustrated in FIG. 11, if a boundary of a flat substrate 201 surrounds a boundary of an orthographic projection of a corresponding converging lens 201 onto the flat substrate 202, that is, the size of the flat substrate 202 is larger than the size of the corresponding converging lens 201, then there will be a gap between adjacent converging lenses 201, so that a part of the light will be emitted from the gap between the adjacent converging lenses 201 instead of being converged, and thus will be wasted. Hereupon, in the embodiments of the disclosure, as illustrated in FIG. 8 and FIG. 9, a boundary of an orthographic projection of a converging lens 201 onto a corresponding flat substrate 202 overlaps with a boundary of the corresponding flat substrate 202.

In the embodiments of the disclosure, since the light-modulating components 20 further include flat substrates 202, the thicknesses of the flat substrates 202 can be adjusted to thereby adjust the heights at which the converging lenses 201 are placed, i.e., the object distances of the converging lenses 201, so that more light can be emitted from the color photoresist patterns 101.

In the embodiments of the disclosure, if the shapes of the converging lenses 201 are arched semi-cylinders, a process of forming the converging lenses 201 will not be limited to any particular process, but an optional implementation thereof will be described below.

Figure 12A:
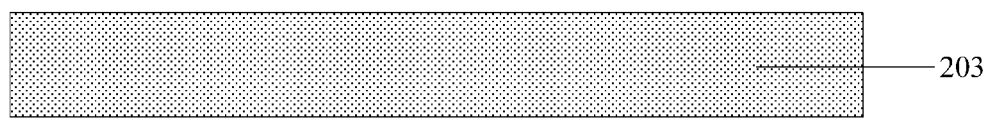
FIG. 12A is a schematic structural diagram of a thin film layer according to the embodiments of the disclosure.
Figure 12B:
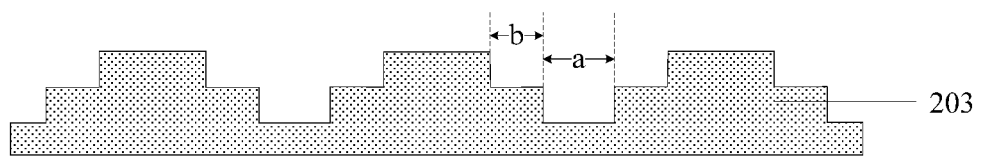
FIG. 12B is a schematic structural diagram after the thin film layer is exposed and developed according to the embodiments of the disclosure.
Figure 12C:
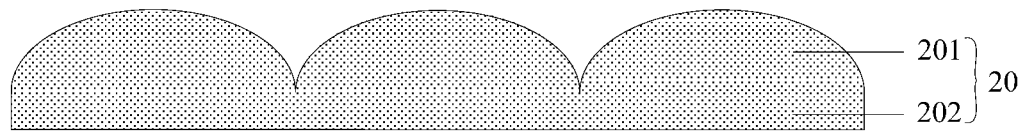
FIG. 12C is a schematic structural diagram of forming a converging lens according to the embodiments of the disclosure.

The first operation is to form a thin film layer 203 as illustrated in FIG. 12A. The second operation is to expose the thin film layer twice in a differentiated mode, where a first area a of the thin film layer is exposed at a high intensity firstly, and then a second area b thereof is exposed at a low intensity. The third operation is to develop the thin film layer to form stepped patterns as illustrated in FIG. 12B, where the second and the third operations are repeated until arc or substantially arc surfaces as illustrated in FIG. 12C are formed. And the fourth operation is to post-bake the thin film layer to form the converging lenses 201. When the light-modulating components 20 include the flat substrates 202, and the flat substrates 202 are formed integrally with the converging lenses 201, the thin film layer 203 can be exposed so that a part of the thin film layer with some thickness is left to form the flat substrates 202 as illustrated in FIG. 12B and FIG. 12C.

In some embodiments, the thin film layer 203 is exposed in a yellow-light process, and since there is an advantage of high alignment precision in the yellow-light process, the converging lenses 201 with small sizes can be formed so that one or more converging lenses 201 can correspond to one color photoresist pattern 101.

Figure 13:
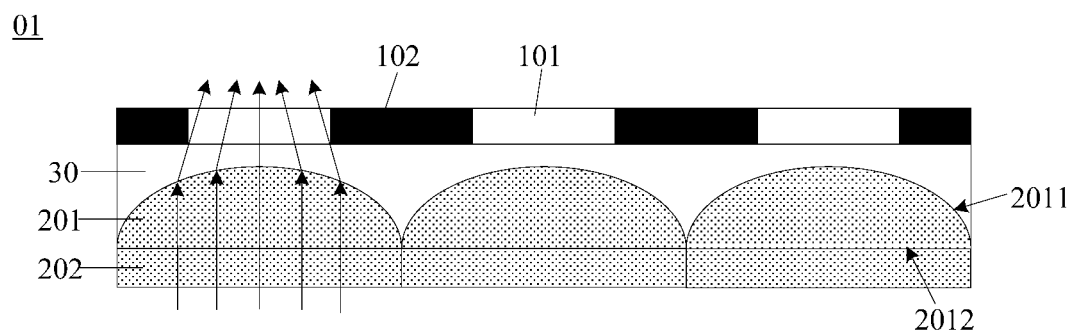
FIG. 13 is a sixth schematic structural diagram of a display panel according to the embodiments of the disclosure.

In some embodiments, as illustrated in FIG. 13, the display panel 01 further includes an Over Coat (OC) layer 30 on the sides of the converging lenses 201 proximate to the color photoresist layers 101 and the black matrix patterns 102.

In some embodiments, the material of the over coat layer 30 will not be limited to any particular material as long as it has a planarization effect. For example, the material of the over coat layer 30 may be an organic material, or may be an inorganic material.

Since the sides of the converging lenses 201 proximate to the color photoresist patterns 101 and the black matrix patterns 102 are not flat, another layer formed on the sides of the converging lenses 201 proximate to the color photoresist patterns 101 and the black matrix patterns 102 will not be flat, so by arranging the over coat layer 30 on the sides of the converging lenses 201 proximate to the color photoresist patterns 101 and the black matrix patterns 102, the layer formed on the converging lenses 201 will be flat, thereby making the light emitted from the display panel 01 being more uniform and having a better characteristic.

In the embodiments of the disclosure, the type of the display panel 01 will not be limited to any particular type. In some embodiments, the display panel 01 is an electroluminescent display panel, where the electroluminescent display panel may be an organic electroluminescent display panel, or may be a Quantum Dot Light-Emitting Diode (QLED) display panel. In some other embodiments, the display panel 01 is a liquid crystal display panel.

Figure 14:
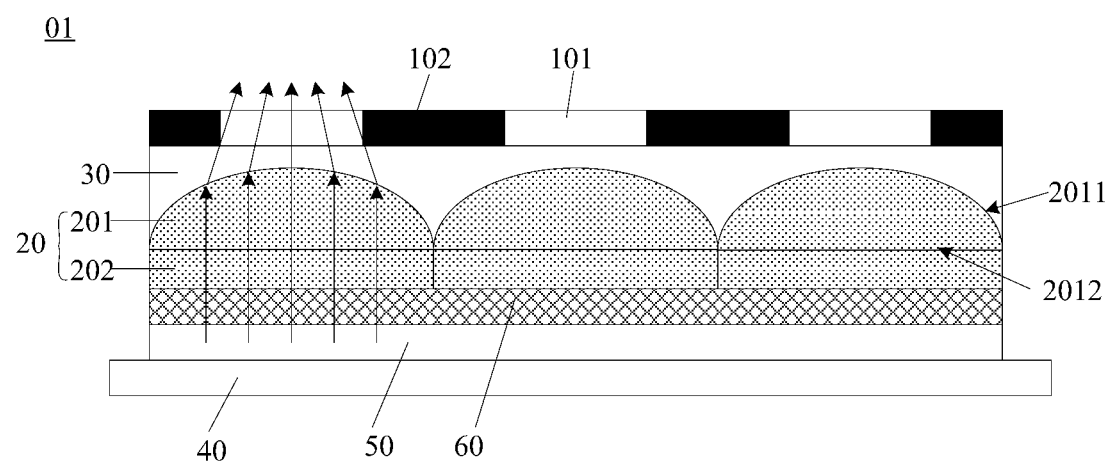
FIG. 14 is a schematic structural diagram of an electroluminescent display panel according to the embodiments of the disclosure.

In the case that the display panel 01 is an electroluminescent display panel, as illustrated in FIG. 14, the electroluminescent display panel further includes a back plate 40, a self-illuminating device 50 on the back plate 40, and an encapsulation layer 60 for encapsulating the self-illuminating device 50, where the self-illuminating device 50 includes a first electrode layer, a light-emitting function layer, and a second electrode layer stacked in that order.

In some embodiments, the back plate 40 is a base substrate. In some other embodiments, the back plate 40 includes a base substrate, and thin film transistors and driving circuits arranged on the base substrate. Each thin film transistor includes a source, a drain, an active layer, a gate, and a gate insulation layer. The driving circuits include a pixel driving circuit, a Gate On Array (GOA) circuit, an Integrated Circuit (IC) driving circuit, etc. In some embodiments, the base substrate is a silicon-based substrate (e.g. a wafer) on which the driving circuits, the thin film transistors, etc., are integrated, and at this time, the display panel 01 is a silicon-based display panel.

In some embodiments, the first electrode layer is an anode, and the second electrode layer is a cathode. In some other embodiments, the first electrode layer is a cathode, and the second electrode layer is an anode. In some embodiments, the light-emitting function layer includes a light-emitting layer. When the electroluminescent display panel is an organic electroluminescent display panel, the light-emitting layer is an organic light-emitting layer; and when the electroluminescent display panel is a quantum dot light-emitting diode display panel, the light-emitting layer is a quantum dot light-emitting layer. In some other embodiments, the light-emitting function layer includes at least one of an electron transport layer, an electron injection layer, a hole transport layer and a hole injection layer, in addition to the light-emitting layer.

In some embodiments, the encapsulation layer 60 is a Thin Film Encapsulation (TFE) layer. In some other embodiments, the encapsulation layer 60 is an encapsulation substrate.

In the case that the display panel 01 is an electroluminescent display panel, the positions of the light-modulating components 20 will not be limited to any particular position. In some embodiments, the light-modulating components 20 are arranged on a side of the encapsulation layer 60 away from the back plate 40 as illustrated in FIG. 14. In some other embodiments, the light-modulating components 20 are arranged between the encapsulation layer 60 and the self-illuminating device 50.

In the case that the display panel 01 is an electroluminescent display panel, the self-illuminating device 50 in the electroluminescent display panel includes a light-emitting function layer. And in order to avoid the performance of the light-emitting function layer from being degraded at high temperature, in the embodiments of the disclosure, the color photoresist patterns 101 are low-temperature color photoresist patterns 101 and since the low-temperature color photoresist patterns 101 are generally formed below 80□, the color photoresist patterns 101 can be formed without degrading the performance of the light-emitting function layer at high temperature.

In the embodiments of the disclosure, in the case that the display panel 01 is an electroluminescent display panel, light emitted by the self-illuminating device 50 passes and is converged by the light-modulating components, and is then transmitted to and exits from the color photoresist patterns 101, thus improving the brightness of the electroluminescent display panel.

Figure 15:
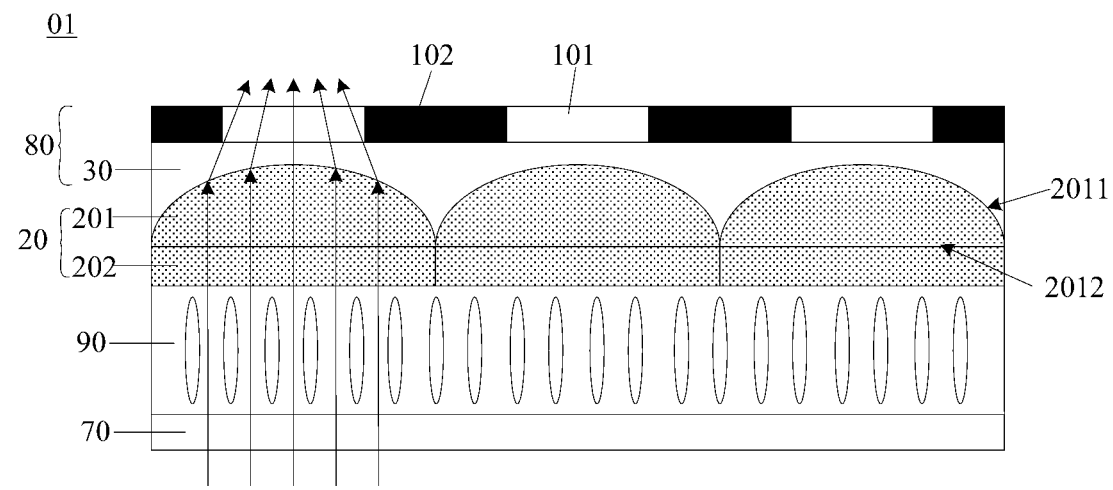
FIG. 15 is a schematic structural diagram of a liquid crystal display panel according to the embodiments of the disclosure.

In some embodiments, in the case that the display panel 01 is a liquid crystal display panel, the liquid crystal display panel includes an array substrate 70, a box alignment substrate 80, and a liquid crystal layer 90 between the array substrate 70 and the box alignment substrate 80 as illustrated in FIG. 15.

In some embodiments, the array substrate 70 includes a base substrate, and thin film transistors and driving circuits on the base substrate. Each thin film transistor includes a source, a drain, an active layer, a gate, and a gate insulation layer. The driving circuits include a pixel driving circuit, a GOA circuit, an IC driving circuit, etc. In some embodiments, the base substrate is a silicon-based substrate on which the driving circuits, the thin film transistors, etc., are integrated, and at this time, the display panel 01 is a silicon-based display panel.

In some embodiments, as illustrated in FIG. 15, the box alignment substrate 80 includes the color photoresist patterns 101 and the black matrix patterns 102, and at this time, the box alignment substrate 80 will also be referred to as a color filter substrate; and the light-modulating components 20 are arranged on the box alignment substrate 80 or the array substrate 70.

In some other embodiments, the array substrate 70 includes the color photoresist patterns 101 and the black matrix patterns 102, and at this time, the array substrate 70 will also be referred to as a Color Filter on Array (COA) substrate; and the light-modulating components 20 are arranged on the array substrate 70.

In the embodiments of the disclosure, in the case that the display panel 01 is a liquid crystal display panel, light emitted by a backlight passes and is converged by the light-modulating components 20 in the liquid crystal display panel, and then is transmitted to and exits from the color photoresist patterns 101, thus improving the brightness of the liquid crystal display panel.

Figure 16:
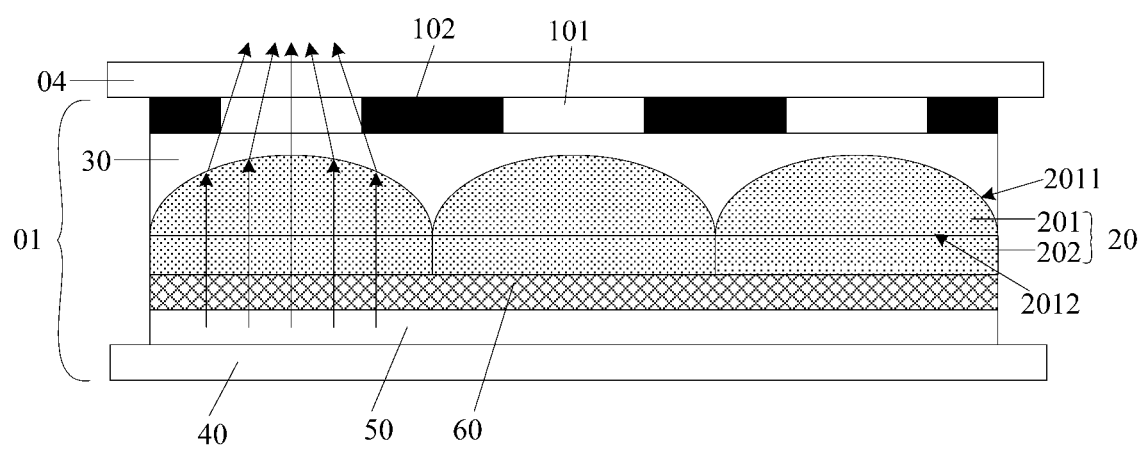
FIG. 16 is a schematic structural diagram of a display device according to the embodiments of the disclosure.

Based upon the same inventive concept, the embodiments of the disclosure further provide a display device, and as illustrated in FIG. 16, the display device includes the display panel 01 above according to the embodiments of the disclosure.

Here in some embodiments, as illustrated in FIG. 16, the display device further includes a protection cover plate 04 in addition to the display panel 01, where the protection cover plate 04 can be a glass cover plate, for example.

It shall be noted that, FIG. 16 simply illustrates the display panel 01 which is an electroluminescent display panel by way of an example, but the display panel will not be limited thereto. For example, the display panel 01 can alternatively be a liquid crystal display panel. When the display panel 01 is a liquid crystal display panel, the display device further includes a backlight for providing the display panel 01 with a light source.

In the embodiments of the disclosure, the display device can be any device displaying a text or an image, whether moving (e.g., a video) or stationary (e.g., static image). To be more precise, the embodiments of the disclosure can be applicable to or associated with various types of electronic devices including but not limited to a mobile phone, a radio device, a Personal Data Assistant (PDA), a handheld or portable computer, a GPS receiver or navigator, a camera, an MP4 video player, a video camera, a game console, a watch, a clock, a calculator, a TV monitor, a flat panel display, a computer monitor, a vehicular display (e.g., an odometer display), a navigator, a cabin controller and/or display, a photo display (e.g., a display of a rearview camera in a vehicle), an electronic photo album, an electronic billboard or directional signboard, a projector, an architectural structure, packaging and aesthetic structure (e.g., a display of a jewelry image), etc., for example.

In some embodiments, the display device according to the embodiments of the disclosure can be a micro display device applicable to a helmet display, a three dimensional display lens, an eye-like display, etc. The micro display device operating with systems such as a mobile communication network system, a satellite positioning system, etc., can obtain precise image information anytime and anywhere, and can be applicable in the fields of national defense, aeronautics, astronautics, individual combating, and other military applications.

The embodiments of the disclosure provide a display device including the display panel above according to the embodiments of the disclosure, where the display panel in the display device has the same structure and advantageous effects as the display panel above according to the embodiments of the disclosure, and since the structure and the advantageous effects of the display panel have been described in the embodiments above, a repeated description thereof will be omitted here.

Further, in the embodiments of the disclosure, in the case that the light-modulating components 20 are converging lenses 201, and the display panel 01 is an electroluminescent display panel, the distance h between the light-emitting function layer, and the optical centers of the converging lenses 201 is $n*r/|n-n'|$.

In the case that the light-modulating components 20 are converging lenses 201, and the display panel 01 is a liquid crystal display panel, the display device further includes a backlight, where the distance h between the backlight, and the optical centers of the converging lenses 201 is $n*r/|n-n'|$.

Here, n is a refractive index of the converging lenses 201, n' is a refractive index of a medium on sides of the converging lenses 201 proximate to the color photoresist patterns 101, and r is a curvature of the converging lenses 201.

It shall be noted that, if the medium on the sides of the converging lenses 201 proximate to the color photoresist patterns 101 is the air, then n' will be 1, or as illustrated in FIG. 16, if the medium on the sides of the converging lenses 201 proximate to the color photoresist patterns 101 is an over coat layer 30, then n' will be a refractive index of the over coat layer 30.

The distance h between the light-emitting function layer (or the backlight), and the optical centers of the converging lenses 201, i.e., object distances of the converging lenses 201, can also be referred to as a height at which the converging lenses 201 are placed.

In the embodiments of the disclosure, in the case that the light-modulating components 20 are converging lenses 201, the distance between a light source (the display panel 01 is an electroluminescent display panel, and the light source is the light-emitting function layer above; or the display panel is a liquid crystal display panel, and the light source is the backlight above), and optical centers of the converging lenses 201 is n*r/|n−n'|, so that more light emitted by the light source can be incident on the converging lenses 201, and exit from the color photoresist patterns 101, thus improving the brightness of the display device.

The foregoing description is only illustrative of the particular embodiments of the disclosure, but the claimed scope of the disclosure will not be limited thereto, and any variations or alternatives thereof which can readily occur to those skilled in the art without departing from the scope of the disclosure shall fall into the scope of the disclosure. Accordingly, the scope of the disclosure shall be as defined in the claims of the disclosure.

The invention claimed is:

1. A display panel, comprising:
   a base substrate;
   a self-illuminating device on the base substrate; wherein the self-illuminating device comprises a first electrode layer, a light-emitting function layer, and a second electrode layer stacked in that order;
   a plurality of light-modulating components comprising converging lenses, provided on a side of the self-illuminating device away from the base substrate, and configured to receive light emitted by the self-illuminating device;
   color photoresist patterns and black matrix patterns for spacing the color photoresist patterns from each other, on a side of the plurality of light-modulating components away from the base substrate;
   an over coat layer on a side of the converging lenses proximate to the color photoresist patterns and the black matrix patterns; and
   an encapsulation layer for encapsulating the self-illuminating device; wherein the encapsulation layer is between the self-illuminating device and the plurality of light-modulating components, or is provided on a side of the plurality of light-modulating components away from the base substrate;
   wherein each of the color photoresist patterns corresponds to at least one of the plurality of converging lenses, and the plurality of light-modulating components are configured to converge light incident thereon and to transmit the converged light to color photoresist patterns corresponding thereto.

2. The display panel according to claim 1, wherein a display area of the display panel is covered with the plurality of light-modulating components.

3. The display panel according to claim 2, wherein the plurality of light-modulating components are formed integrally.

4. The display panel according to claim 1, wherein a boundary of an orthographic projection of a light-modulating component onto a corresponding color photoresist pattern surrounds a boundary of the color photoresist pattern, or is surrounded by the boundary of the color photoresist pattern, or overlaps with the boundary of the color photoresist pattern.

5. The display panel according to claim 1, wherein shapes of the converging lenses are arched semi-cylinders, arc surfaces of the arched semi-cylinders are proximate to the color photoresist patterns than chord surfaces thereof.

6. The display panel according to claim 1, wherein the plurality of light-modulating components further comprise a flat substrate on a side of the converging lenses proximate to the base substrate.

7. The display panel according to claim 6, wherein a boundary of an orthographic projection of the converging lenses onto the flat substrate overlaps with a boundary of the flat substrate.

8. The display panel according to claim 6, wherein the flat substrate is formed integrally with the converging lenses.

9. The display panel according to claim 1, wherein the base substrate comprises a silicon-based substrate, and driving circuits on the silicon-based substrate.

10. The display panel according to claim 1, wherein the electroluminescent display panel comprises an organic electroluminescent display panel, or a quantum dot light-emitting diode display panel.

11. A display device, comprising the display panel according to claim 1.

12. The display device according to claim 11, wherein:
   the self-illuminating device comprises a light-emitting function layer; and
   a distance h between the light-emitting function layer of the electroluminescent display panel, and optical centers of the converging lenses is n*r/|n−n'|,
   wherein n is a refractive index of the converging lenses, n' is a refractive index of a medium on sides of the converging lenses proximate to the color photoresist patterns, and r is a curvature of the converging lenses.

* * * * *